United States Patent

Bell et al.

[15] 3,643,076

[45] Feb. 15, 1972

[54] PROCESS CONTROLLER

[72] Inventors: Charles Anthony Bell, Biggleswade, England; Anthony David Young, Victoria, Australia

[73] Assignee: National Research Development Corporation, London, England

[22] Filed: Sept. 3, 1969

[21] Appl. No.: 854,889

[30] Foreign Application Priority Data

Sept. 4, 1968 Great Britain......................42,065/68

[52] U.S. Cl..................235/151.1, 235/151.12, 235/151.34, 235/92 CP
[51] Int. Cl........................................................G06f 15/46
[58] Field of Search....................235/151.1, 151.12, 151.11, 235/151.35, 151.34; 318/561, 565

[56] References Cited

UNITED STATES PATENTS

| | | | |
|---|---|---|---|
| 3,275,988 | 9/1966 | Yetter | 235/151.2 X |
| 3,265,873 | 8/1966 | Swyer | 235/151.35 X |
| 3,506,811 | 4/1970 | Yetter | 235/151.1 |

Primary Examiner—Eugene G. Botz
Assistant Examiner—Edward J. Wise
Attorney—Cushman, Darby & Cushman

[57] ABSTRACT

A control system is described which has a number of control loops with individual sensing and actuating stages but a common arithmetical unit for calculating digital error and error rate signals. A common set point store is also provided for providing reference information for the arithmetical unit. Such a control system is useful where there are too few control loops to warrant the use of a computer.

Actuator drive apparatus is also described for providing a drive signal for the actuators in the loops. The apparatus receives the error signal and the error rate signal from the arithmetical unit, and multiplies these signals by constants by counting down registers containing the signals at preselected rates. If the signals have the same sign the registers are counted down one after the other and the actuator is energized for the duration of countdown, but if the signals are of different sign the registers are counted down concurrently until one reaches zero, and then the actuator is energized while the other register completes countdown.

13 Claims, 5 Drawing Figures

PROCESS CONTROLLER

The present invention relates to actuator-drive apparatus, particularly but not exclusively, for use in control apparatus for chemical processes in industrial plant.

In chemical industrial plant it is often desired to control a quantity such as a flow rate of a liquid, or a temperature to a desired value. This can be carried out by measuring the existing value of the quantity and automatically comparing the measured value with the desired value. The result of the comparison is then used to control an actuator which itself determines, at least partially, the value of the quantity; that is a servo loop is set up.

According to the present invention, there is provided actuator-drive apparatus for providing a signal to drive a reversible actuator in dependence upon groups of digital input signals, including a number of numerical storage means, one storage means for, and associated with, each of a number of digital input signals in a group of such signals, and each storage means being adapted to store a number and a sign representing the associated signal in each group, countdown means for counting the numbers stored by the storage means down to zero at selectable predetermined rates, individual to each element, and control means for forming the sum of the times taken to count down the numbers stored by the storage means, taking account in forming the said sum of the signs of the numbers counted down, the control means also being adapted to provide a drive signal for an actuator for a time, and in a direction, determined by the sum and its sign, respectively.

Where a number of loops is to be controlled measurements of quantities to be controlled in various forms, such as analog voltage or current, or pulse rate, can be passed to a computer which calculates independently for each loop how the associated actuator is to behave, sending its output again in various forms. This is a wasteful arrangement since where a small number of loops is required, for example, less than 30, much of the computer is redundant, and also because the connections to the various measurement points and actuators are complicated and have to be dealt with by the computer in different ways, depending on which form of input and output are received or required.

The actuator-drive apparatus may be part of control apparatus including a plurality of measurement means, each of which has a digital output and is adapted to measure a quantity to be controlled, selection means for repeatedly selecting the outputs of the measurement means one at a time and for selecting, at the same time, the appropriate one of a plurality of numerical inputs to the apparatus which are representative, at that time, of desired values of the quantities measure, and calculating means for determining errors by finding the difference between the concurrent selected output and selected numerical input, there being one said actuator-drive apparatus having one storage means and one countdown means, associated with each measurement means, for multiplying the difference derived from measurement by that measurement means by a predetermined constant proportional to the predetermined countdown rate for that storage means, the actuator of said one apparatus controlling, at least partially, the quantity measured by that measurement means.

Preferably the control apparatus includes a number of stores, one for each measurement means, for storing the said errors; and the calculating means is additionally adapted to determine the difference between each error and the previous error relating to a quantity measured by the same measuring means, thus giving a rate of change of error signal.

Further stores may be included, and the apparatus adapted to calculate additional terms in the following algorithm suitable for control processes:

$$\Delta P(nT) = K_1 e(nT) + K_2[e(nT) - e(n-1)T] + \ldots$$

$$\ldots + K_p[e(nT) - (p-1)e((n-1)T)$$

$$+ \frac{(p-1)(p-2)}{2!} e((n-2)T) \ldots$$

$$+ (-1)^s \frac{(p-1)(p-2) \ldots (p-s)}{2!} e((n-s)T) \ldots$$

$$+ (-1)^{p-1} e((n-(p-1))T)] \quad (1)$$

where $\Delta P(nT)$ is an increment of the actuator means position after a number, $n$, periods of time $T$; $K_1, K_2 \ldots K_p$ are constants (which the countdown means multiply by the calculated differences) and $e(nT), e(n-1)T \ldots e(n-(p-1))T$ are errors obtained by taking the measured quantity from the desired quantity (set point) at times $nT, (n-1)T \ldots (n-(p-1)T$, respectively.

One of the advantages of the control apparatus is that a user need only provide equipment for the number of control loops actually required. A common calculator means for all loops is required plus a measurement means, a multiplier means and an actuator means for each loop. When more loops are required further measurement means, multiplier means and actuator means are added. This makes the apparatus as much as 75 percent cheaper than some systems for similar applications. Some parts may even be duplicated to give increased reliability without losing this economic advantage. Another advantage is that the measurement means, multiplier means and actuator means can be located in an unfavorable position, which is, for example, hazardous, or electrically noisy positions, since their working levels can be made high, while the common calculator means is located in any convenient position which is taking the same examples, safe or screened, from noise. Since the measurement means provides a digital output and the multiplier means drives the actuator means from a digital signal, the connections between various locations may be very simple, consisting of a few wires only.

The control apparatus lends itself to modular or integrated circuit construction since the part thereof which is common to all loops can be accommodated on one or more modules or chips, and one or more modules or chips can be provided for each loop as and when required.

The selection means may include a computer programmed to provide the said numerical inputs or the set points, that is, desired stages in a process, for example, flow rates or temperatures expressed as binary numbers for a given location in a plant carrying out the process.

It may be preferably for some plants and processes if, instead of or in addition to the computer, the selection means includes a matrix of conductors, one group of conductors forming the rows of the matrix and the other forming the columns thereof. If the rows or columns are subdivided into groups, one group for each loop, each conductor in each group representing a power of 2, a set point can be programmed by connecting the conductors representing the appropriate powers of 2 to one of the columns or rows, respectively. Means are then provided for sequentially marking the columns or rows, respectively, so that each set point value representing a stage in the process for each loop is marked sequentially, and at the same time as set points corresponding to the same stage for other loops. The selection means then preferably also includes scanning means for transferring the outputs of the measurement means, when a measurement is complete, and the appropriate set point value available from the matrix at that time, to the calculating means.

The apparatus may include program interrupt means for interrupting the sequential marking of the columns or rows, and allowing it to proceed only when one or more conditions have been reached in the controlled plant. For example, it may be necessary to wait until a certain temperature has been reached before the program is allowed to continue.

Each actuation-drive apparatus preferably comprises a register, as the numerical storage means for each term in equation 1, so coupled to an oscillator that the oscillator counts down the contents of the register. The rate at which each register is counted down is set by selecting the output frequency of the oscillator to represent a chosen value for that one of the constants $K_1, K_2$ to $K_p$ which is the multiplier in the term associated with that register.

This arrangement is particularly convenient where the actuator includes an induction motor, since the motor is switched on to run in one direction only for a time determined by the logic means and countdown. The actuators may instead by any drive means which has constant velocity drive —such as a synchronous motor.

Each measuring means may include a voltage-to-frequency converter which takes an analog voltage representative of some quantity, such as the rate of flow of a liquid in a chemical plant, and converts this voltage to a signal whose frequency is dependent thereon. The available frequency signal may then be passed through a gate to a counting register, the gate being opened by an adjustable pulse generator for a selected time.

An embodiment of the invention will now be described, by way of example, with reference to the accompanying drawings, in which.

Figure 1:
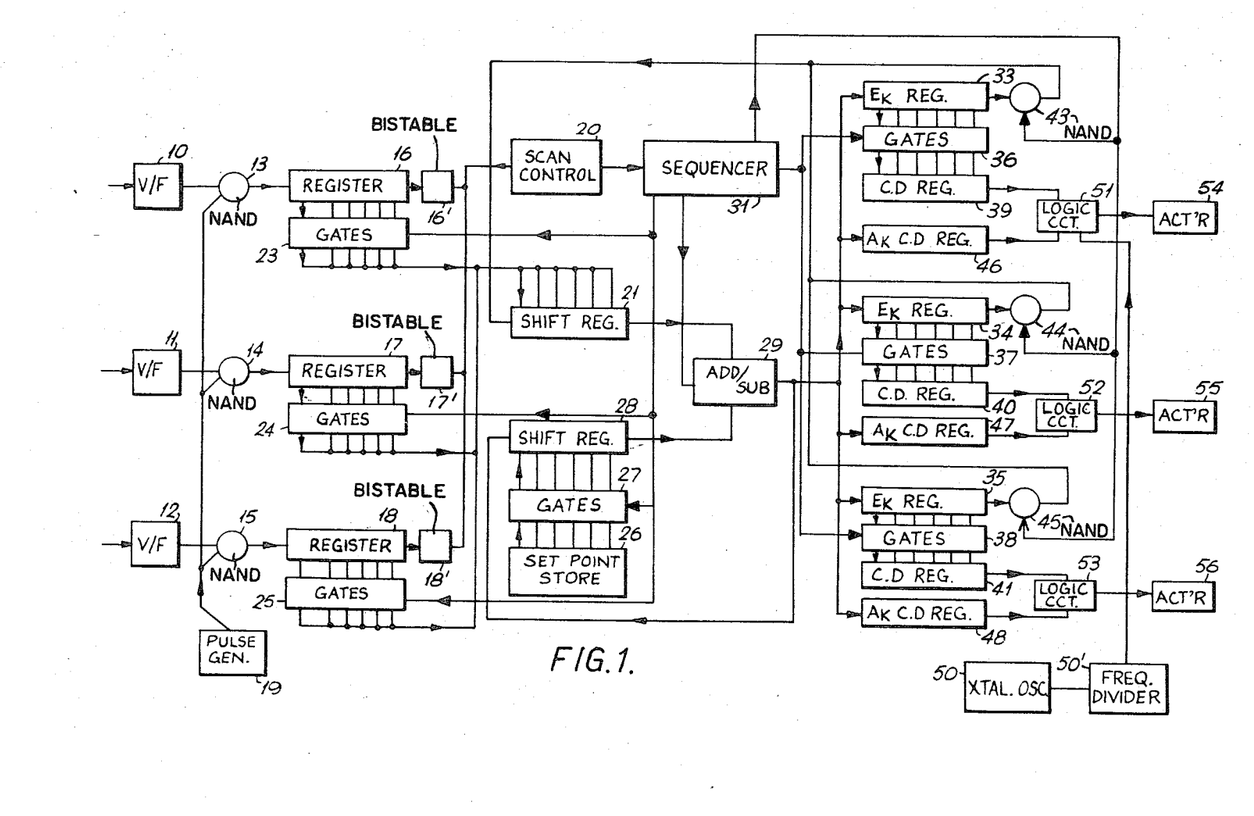
FIG. 1 is a block diagram of control apparatus for a chemical plant.

The apparatus of FIG. 1 is to control a chemical plant which has three servo loops. Three voltage-to-frequency converters 10, 11 and 12, convert analog voltages representative of measured quantities to signals whose frequencies depend on the analog voltages. The converters 10, 11 and 12, are connected by way of NAND-gates 13, 14 and 15, to counting registers 16, 17 and 18 respectively. The NAND-gates 13, 14 and 15, are opened by pulses applied from a pulse generator 19, whose output pulse lengths can be separately selected for each gate. Hence the gates 13, 14 and 15, are open for intervals selected as required to provide convenient binary numbers in the registers 16, 17 and 18, representative of the quantity to be measured.

The registers 16, 17 and 18 have associated bistable circuits 16', 17' and 18', respectively, which are set to a predetermined state when the gates 13, 14 and 15, respectively, are closed. A scan control circuit 20 checks the state of the bistable circuits in turn until one of them is found to be in the predetermined state. The circuit 20 then causes a sequencer 31 to open the appropriate one of the groups of NAND-gates 23, 24 and 25 to read the contents of one of the registers 16, 17 and 18 into a shift register 21. NAND gates are used because each register stage is so coupled that it requires an applied zero to set a 1.

The sequence 31 comprises a divide by 10 circuit coupled to a shift register. A clock pulse generator for the apparatus feed clock pulses to the divide circuit so that the shift register is advanced once every 10 clock pulses. Each stage of the shift register provides control signals for a different function so that each function under the control of the sequencer is carried out in the required order. The divide by 10 circuit allows functions which require a number of clock pulses to complete to be carried out before the sequencer initiates the next function.

When calculations on the contents of the register 21 have been completed the scan control circuit continues to check the bistable circuits 16', 17' and 18' until one of these circuits is again found to be in the predetermined state.

Figure 2:
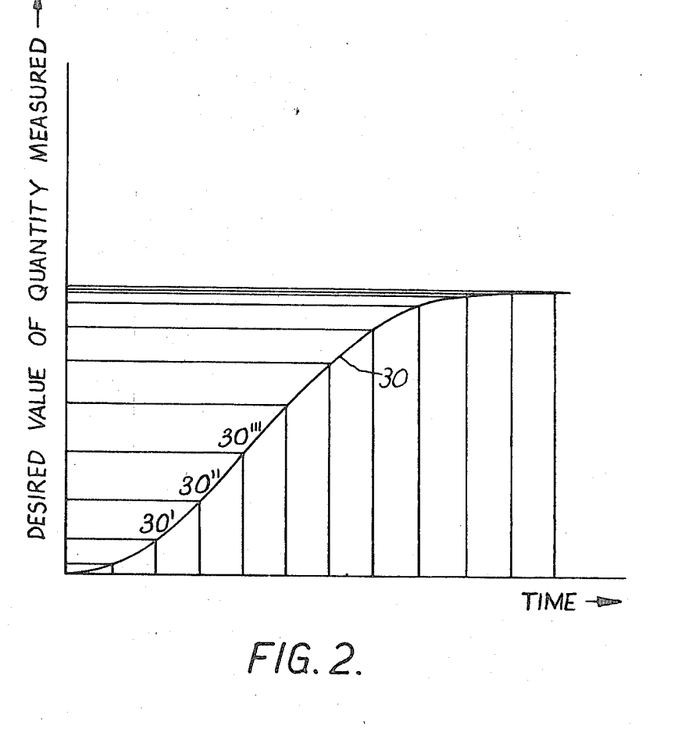
FIG. 2 is a curve showing how a quantity in an exemplary control loop is to vary.

While the contents of one of the registers 16, 17 and 18, is transferred a number from a set point store 26, is passed by way of a group 27 of NAND gates, to a shift register 28. Transfer is under the control of the scan control circuit 20, which ensures that the set point for the correct loop is transferred as well as the sequencer 31. The number transferred represents the desired value of the measured quantity at that time, and the set point store is arranged to pass the required numbers to the shift register 28, according to a predetermined sequence in a way which is described below. For example, it may be that the quantity measured in one loop is ideally to follow the curve 30 of FIG. 2 as the process proceeds. The desired values 30', 30'', 30''' and so on of the measured quantity at equal time intervals are found from the curve. These desired values are the set points, and after being suitably digitized they are entered in the set point store to be read subsequently into the register 28 as operation proceeds. The set point store may also be arranged to allow operation to continue to a new set point only if it has reached a certain stage, as indicated by measurements from transducers (not shown) in the plant. This is a useful facility in chemical plant where a complicated process is being controlled. The set point store may be replaced or augmented by a computer which calculates desired changes in the quantities measured.

The shift registers 21 and 28, now contain a measured value and a desired value which are together transferred digit by digit to an adder/subtracter, 29, which finds the difference between the values and takes note of the sign of this difference. The output of the adder/subtracter is the error between the desired and measured values, and is known in this specification as the $E_k$ error. The adder/subtracter 29 is under the control of the sequencer 31.

Each control loop includes one of registers 33, 34 and 35 which are associated with the voltage-to-frequency converters 10, 11 and 12, respectively. The error $E_k$ is transferred to one of the registers 33, 34 and 35, depending on for which loop it was calculated.

The contents of the registers 33, 34 and 35, are transferred under the control of the sequencer 31 by way of groups 36, 37 and 38 of NAND gates, to countdown registers 39, 40 and 41, respectively. Each $E_k$ signal is also passed under the control of the sequencer 31, through the appropriate one of NAND-gates 43, 44 and 45, back to the shift register 21. This transfer takes place when a new $K_k$ error for the same control loop has been calculated. Each $E_k$ error, in addition to being passed to one of the registers 33, 34 and 35, is also passed to the register 28, so that the difference between one $E_k$ error and the previous $E_k$ error can be calculated to provide a rate of change of error signal known, in this specification, as the $A_k$ error.

The adder/subtracter 29 under the control of the sequencer 31 find the $A_k$ error signal by finding the difference between the contents of the shift registers 21 and 28. The $A_k$ error is then transferred to the appropriate one of countdown registers 46, 47 and 48, depending on the loop for which the error has been calculated, the registers 46, 47 and 48 being associated with the voltage-to-frequency converters 10, 11 and 12, respectively.

In order to complete the generation of the first two terms of the algorithm given in equation 1, the contents of the countdown registers for each loop, that is registers 39 and 46, or registers 40 and 47, or registers 41 and 48, must be multiplied by the appropriate constants $K_1$ and $K_2$. This is done by counting down each of the registers 39 to 41 and 46 to 48, under the control of a variable clock pulse generator which can be set, for example, by means of a patch board, for selecting an output from a frequency divider 50' coupled to a crystal oscillator 50, or a number of potentiometers, controlling individual oscillators, to supply a selected frequency for each individual countdown register. The clock pulse generator is coupled to the countdown registers by means of logic circuits 51, 52 and 53, which will be described below. There is one logic circuit for each control loop, the logic circuits 51, 52 and 53 being associated with the pairs of registers 39 and 46, 40 and 47, and 41 and 48, respectively.

It is often convenient to use an actuator incorporating an induction motor to effect control of a loop. Since an induction motor takes a high starting current and is therefore under stress during starting, it is advisable to start the motor as little as possible. Thus if the $E_k$ and $A_k$ errors have different signs, it it better to find the difference between these errors before starting the motor, instead of running the motor in one direction while the $E_k$ error is counted down, and then running it in the other direction while the $A_k$ error is counted down.

Thus each of the logic circuits 51, 52 and 53, first determines the signs of the $E_k$ and $A_k$ errors, and if these signs are the same counts down these errors one after the other. If the signs are not the same both errors are counted down at the same time so that usually one error will have been counted down before the other. The time during which one countdown continues by itself is then equal to the difference between the two errors as multiplied by the constants $K_1$ and $K_2$.

The logic circuits 51, 52 and 53, provide a signal driving actuators 54, 55 and 56 respectively, while one of the registers of the associated pair of registers only is being counted down, no signal being provided when the two registers of a pair are being counted down at the same time. The actuators, 54, 55 and 56, control, at least partially, the quantities measured by the voltage-to-frequency converters 10, 11 and 12, respectively, but the quantities may also depend on other factors, for example, the state a reaction has reached, the flow from another part of the plant, or the temperature of incoming liquid.

Figure 3:
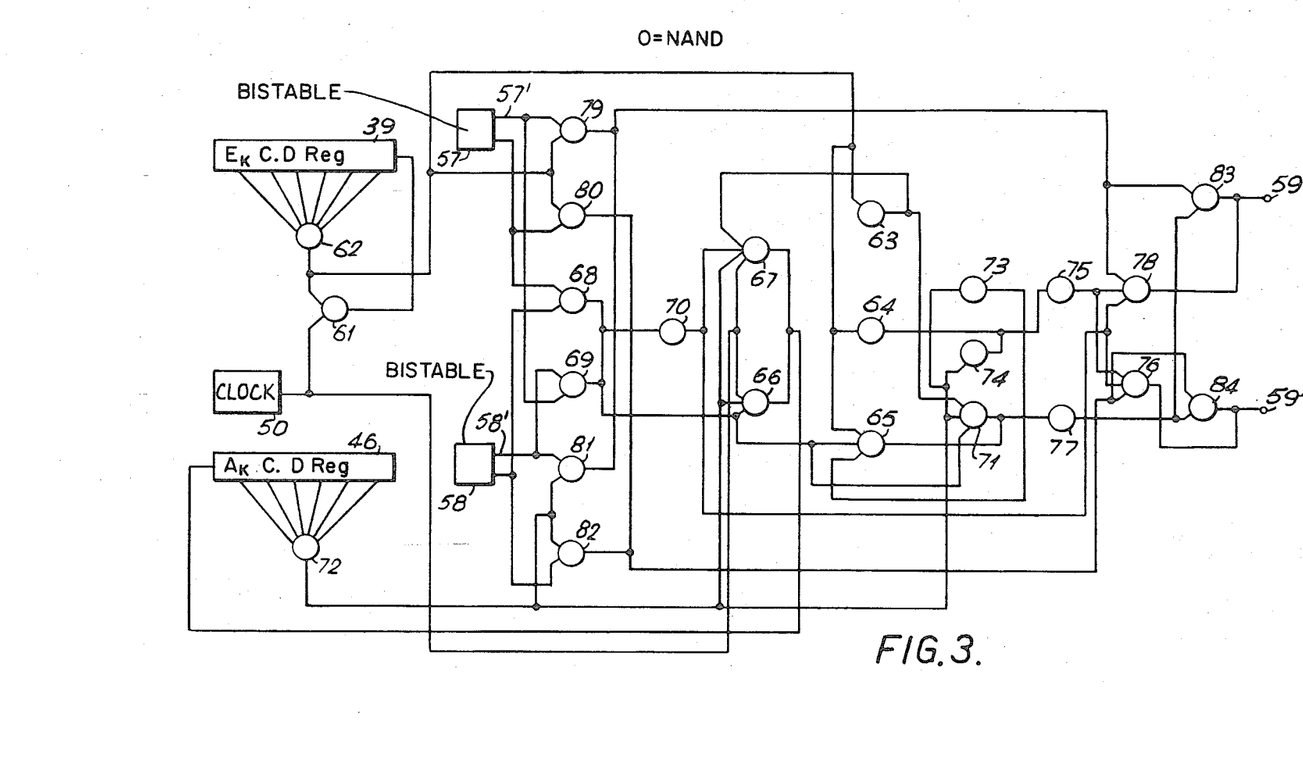
FIG. 3 is a block diagram of one embodiment of actuator-drive apparatus according to the invention and includes one of the logic circuits of FIG. 1.

The logic circuits 51, 52 and 53, are of the same construction and the circuit 51 will now be described with reference to FIG. 3. The gates shown in FIG. 3 are NAND gates, and since their interconnections are shown in the figure they will not be described in detail. Positive logic is used; thus a 1 indicates that a voltage is present, while 0 indicates that no voltage is present.

The clock pulse generator 50 counts the register 39 down by way of a gate 61. The register 46 is counted down by way of gates 66 or 67.

The register 39 is always counted down immediately the sequencer 31 determines that the countdown should take place, but the register 46 may count down at the same time or after the countdown of the register 39 has been completed, depending on the condition of bistable circuits 57 and 58, which hold the signs of the $E_k$ error and the $A_k$ error, respectively.

When the signs of the $E_k$ and $A_k$ errors are the same, gates 76 and 78 provide pulses at terminals 59 and 59'. The actuator 54 is connected to the terminals 59 and 59' so that if a pulse appears at the terminal 59 the actuator moves in one direction, but if the pulse appears at the terminal 59', the actuator moves in the other direction. If the signs are not alike, forward or reverse pulses at the terminals 59 and 59' are provided by gates 83 or 84 respectively. The gates 78 and 83 are partially under the control of gates 79 and 81, and the gates 76 and 84 are partially under the control of gates 80 and 82, the gates 79 to 82 being themselves partially controlled by the bistables 57 and 58. The remainder of the gates shown in FIG. 3 determine which of the gates 76, 78, 83 and 84 operate.

The bistable circuits 57 and 58 each have two complementary outputs, the outputs 57' and 58' being 1, when the bistable is set to the 1 state.

If both the $E_k$ and $A_k$ errors are positive a gate 68 has a 1 on both inputs, and consequently its output is 0. When both errors are negative a gate 69 has a 1 on both inputs and its output is 0. Since the outputs of the gates 68 and 69 are connected together to perform a wired OR function, the combined output of both these gates is 0 if either of the individual outputs is 0, and gates 65, 66 and 71 are inhibited. Assuming that initially the $E_k$ countdown register 39 does not contain zero, then a gate 62 which has an input from every stage of the register 39 has a 1 as its output. This 1 is inverted by a gate 63, and the resultant 0 inhibits the gate 67. Since both the gates 66 and 67 are inhibited, clock pulses cannot pass to count down the $A_k$ error in the register 46.

The register 39 will, however, be able to count down since the gate 61 is open, but when its contents reach zero the output of the gate 62 will become 0, inhibiting the gate 61. The 0 from the gate 62 is inverted by the gate 63, and the resultant 1 is applied to the gate 67, and clock pulses pass to the $A_k$ countdown register 46. When this register is empty the output of a gate 72, which has an input from every stage of the register 46, becomes zero, inhibiting the gate 67 and preventing further clock pulses reaching the register 46.

While the registers 39 and 46 are counting down one after the other, an output pulse is required for the actuator 54. This output pulse is generated as follows. A gate 64 inverts the output of the gate 62, and a gate 74 inverts the output of the gate 72. Since the gate 64 and 74 are connected to provide a wired OR function, if the contents of either of the registers 39 and 46 is not zero, the combined output of the gates 64 and 74 will by 0. This 0 is inverted by a gate 75, and the resulting 1 is applied to the gates 76 and 78.

If the signs of the $E_k$ and $A_k$ errors are both positive, the combined output of the gates 80 and 82 will be 0 during the countdown period. This 0 will inhibit the gate 76, and hence only the gate 78 is able to provide an actuator-drive pulse at the terminal 59 in response to the 1 from the gate 75.

If the $E_k$ and $A_k$ errors are both negative the combined output of the gates 79 and 81 is 0, and this 0 inhibits the gate 78. Only the gate 76 will provide a pulse to drive the actuator at the terminal 59' in response to the 1 from the gate 75.

If the error signals have different signs, the gates 68 and 69 will each have an 0 on one input, and in consequence the combined output will be 1 causing gate 70 output to go to 0 thus inhibiting the gates 67, 76 and 78. Since the gate 66 is not inhibited by the combined output of the gates 68 and 69, the supply of clock pulses to the $A_k$ count down register 46 is controlled only by the contents of this register by way of the gates 66 and 72. Hence the two countdown registers will count down in parallel, and each will stop when it becomes empty.

When both the registers 39 and 46 contain numbers other than zero the output of the gates 62 and 72 is each 1. The 1 from the gate 62 is fed to the inputs of the gates 63 and 65, where the gate 63 inverts the 1 and passes the resultant 0 to one input of the gate 71. The 1 from the gate 72 is fed directly to the input of the gate 73, and another input of the gate 71, the gate 73 inverting this input and forwarding the resultant 0 to the gate 65. Hence the combined output of the gates 65 and 71 is 1, and this 1 is inverted by a gate 77 inhibiting the gates 83 and 84.

If the register 39 is counted down first the output from gate 62 is 0, and this 0 is applied to one input of the gate 65 and to the input of the gate 63. The gate 63 inverts this 0 and passes the resultant 1 to one input of the gate 71 which now has a 1 on all its inputs, and its output becomes 0. A gate 77 inverts this 0, and the resultant 1 is applied to the gates 83 and 84. This 1 is maintained until the register 46 is empty, when the output of the gate 77 becomes 0, since the 0 from the gate 72 causes the output of the gate 71 to become 1. When a 1 is applied to the gates 83 and 84 actuator pulses appear at the terminals 59 or 59' in dependence on which of the gates 79 to 82 are open, and this is determined by the condition of the bistables 57 and 58.

If the register 46 empties first, the output of the gate 72 becomes 0, and this is inverted by a gate 73 and the resulting 1 is applied to the gate 65. When the contents of the register 39 becomes zero, the gate 65 is opened, and as previously explained a 1 is then applied to the gates 83 and 84.

If the register 39 is empty the 0 from the gate 62 inhibits the gates 79 and 80, and therefore the gates 81 and 82 determine the direction in which the actuator must move according to the state of the bistable 58. If the register 46 empties first, the gates 81 and 82 are inhibited by the 0 from the gate 72, and the gates 79 and 80 determine the direction of movement of the actuator according to the bistable 57.

A drive pulse on the terminal 59 is generated when the inputs of the gate 83 are both 1, resulting from the output of the gate 77, and of the combined output of the gates 79 and 81. A pulse on the terminal 59' will be generated when the inputs of the gate 84 are both made 1 by the output of the gate 77 and the combined output of the gates 80 and 82.

While a particular design of logic circuit has been described, any other form of logic circuit could be used, provided it generates the required actuator drive pulse, depending on the sign of the contents of the registers 39 and 46. Other logic circuits for driving the actuators may be provided in which the countdown registers are caused to always count down one after the other, or at the same time.

The drive pulses at the terminals 59 and 59' cause individual associated transistors to conduct, operating relays controlling a reversible contactor for the induction motor of the actuator.

Figure 5:
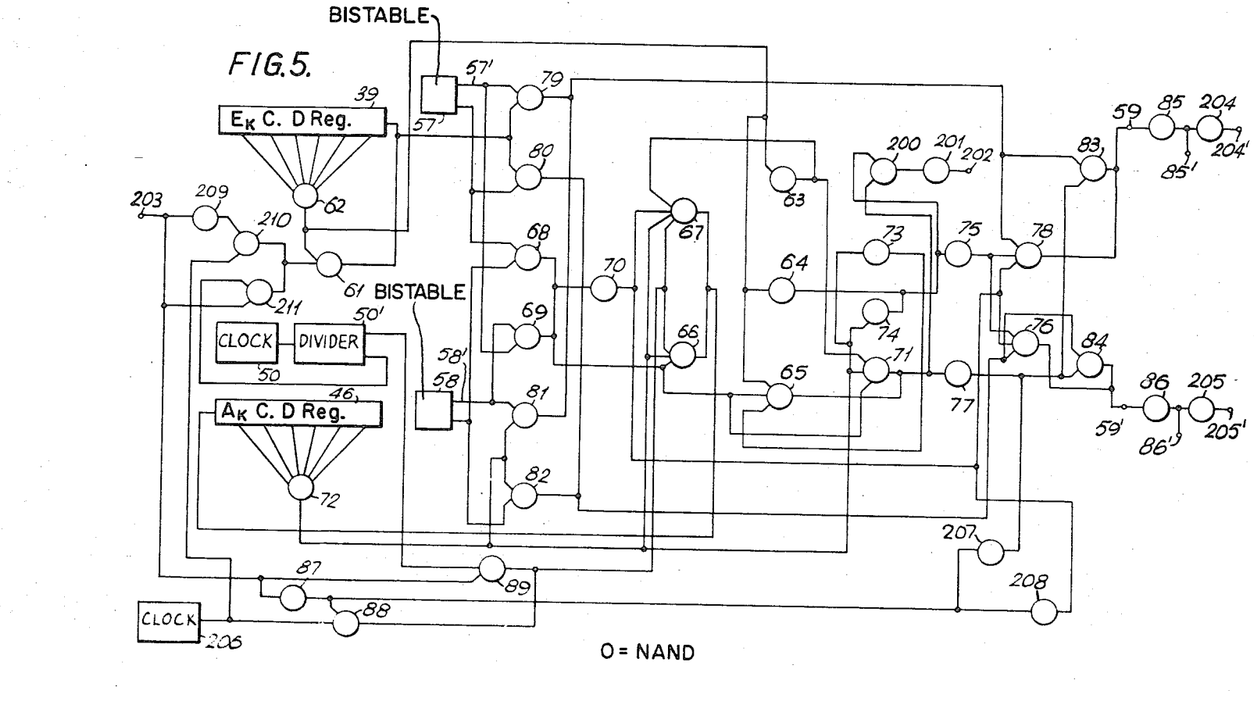
FIG. 5 is a block diagram of another embodiment of actuator-drive apparatus according to the invention and includes an alternative logic circuit for FIG. 3.

The modifications of FIG. 3 shown in FIG. 5 allow measurements made in other parts of the plant to be taken into account in controlling an actuator; for example a feed-forward measurement taken in front, as regards flow through the plant, of the actuator may be introduced. As in FIG. 3 all gates are NAND gates.

Two circuits each as shown in FIG. 5 are then required for each actuator. Typically feedback signal would be received in the registers 39 and 46 of one circuit and the feed-forward signal would be received in the registers 39 and 46 of the other circuit.

One of the two circuits is chosen as master circuit, and on occasions when both of the circuits generate actuator control signals simultaneously the master circuit has overriding control of the actuator and inhibits the signal from the secondary circuit for that sample interval. The inhibit signal appears at a terminal 202 in the master circuit which is connected to a terminal 203 in the secondary circuit. Terminals 204' and 205' of the master are connected to terminals 59 and 59' of the secondary, respectively.

When either of the registers 39 and 46 in the master circuit contain numbers, the master circuit requires to control the actuator and an inhibit signal in the form of a 0 at the terminal 202 appears by way of NAND-gates 200 and 201. If either register 39 or 46 contains a number the gate 200 will receive a 0 under the control of the gates 62 and 64, and the gates 72 and 71 respectively.

The inhibit signal appears at the terminal 203 of the secondary circuit where it is inverted by a gate 209 allowing a gate 210, which also received pulses from a fast clock pulse generator 206, to open. Hence the register 39 will be counted down quickly by way of the gate 61. Similarly an inverting gate 87 and a gate 88 allow the register 46 to be counted down quickly by way of the gate 66 or 67. At the same time, gates 211 and 89 prevent pulses from the clock pulse generator 50 reaching the registers 39 and 46.

The inhibit signal also reaches gates 207 and 208 after inversion by the gate 87. Thus the gates 76, 78, 83 and 84 in the secondary circuit are prevented from operating the actuator by way of gates 85 and 86 and terminals 85' and 86'.

Each actuator is controlled by the presence of a positive pulse at the terminals 85' and 86' of the secondary circuit, obtained by the inverting gates 85 and 86 either from the gates 83 and 78, and the gates 84 and 76 of the secondary circuit, when not inhibited or gates 204 and 205 of the master circuit.

Figure 4:
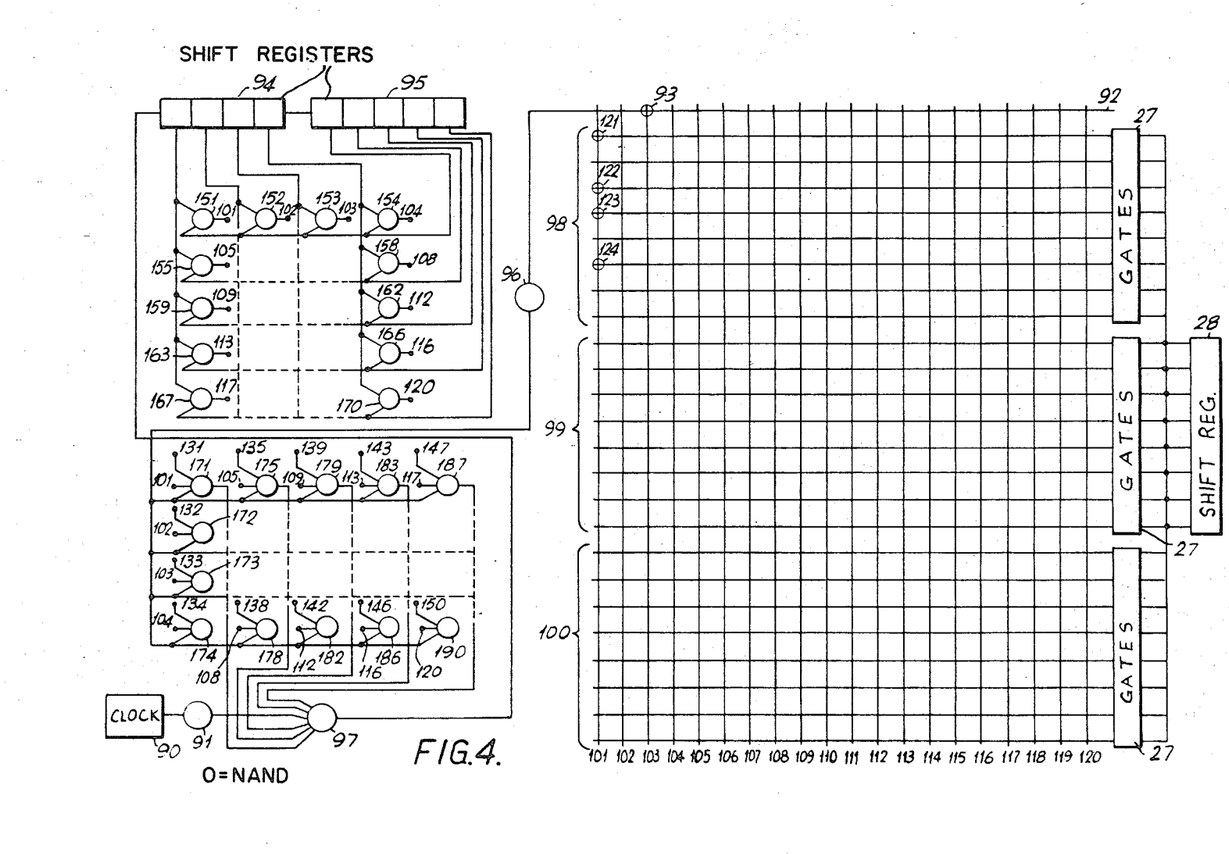
FIG. 4 is a block diagram which includes the set point store of FIG. 1.

The set point store 26 will now be described with reference to FIG. 4, where a number of X-coordinate conducting bars 101 to 120 form a matrix, but are insulated from a number of Y-coordinate conducting bars arranged in three groups 98, 99 and 100, one group for each loop.

In order to program a number of set points for a control loop, diodes are connected between the X- and Y-bars. Taking the group 98 as an example, each Y-bar is given a value which it represents. For example, the bottom conductor in the group may represent $2^0$, the wire above it $2^1$, and so on so that the last wire represents 128 or $2^7$. The X- and Y-bars are mounted on opposite faces of a fiberglass panel in a known way, and the diodes are made to plug into the panel to connect the bars on opposite faces. FIG. 4 shows one set point programmed, using diodes 121 to 124.

The X-coordinate bars are driven 0 in turn, and held in this condition while the calculation of the $E_k$ and $A_k$ errors for each loop are carried out. As each measured value is gated into the shift register 21 the set point value at that time for the same loop is gated from the Y-coordinate bars by means of the gates 27 into the shift register 28.

In order to drive each X-coordinate conductor 0 in turn, registers 94 and 95 are provided. At the start of a process the left-hand stages of these registers, are set to 1. As clock pulses from a source 90 pass by way of an inverter 91 and a NAND-gate 97, the circulative shift register 94 passes the 1 from stage to stage. When it returns to the left-hand stage it causes the 1 in the shift register 95 to move to the next stage of that register.

Every stage of the registers 94 and 95 is coupled to an associated one of NAND-gates 151 to 170, which are shown arranged in four columns and five rows. The gates have two inputs, one of which is connected in a column, and one of which is connected in a row. Each column is connected to one stage of the register 94, and each row to one stage of the register 95. The output of the gates 151 to 170 are connected as indicated by designations 101 to 120 to the X-coordinate bars 101 to 120. As the registers 94 and 95 cycle through their various stages, the gates 151 to 170 open, driving each X-bar 0 in turn.

It is sometimes desirable in a chemical process, for example, for the changes in control to be held up until one or more of a number of conditions of, for instance, flow rate or temperature have been reached. The set point store of FIG. 4 provides this facility.

Each of a number of NAND-gates 171 to 190 has three inputs, one coupled by way of an inverter 96 to a program interrupt bar 92 forming an additional Y-coordinate bar of the matrix, the second to one only of the X-coordinate wires as indicated by the designations 101 to 120 by way of one of a number of inverters (not shown), and the third to a transducer associated with that gate being one of a number of transducers (not shown) which provide 0 when a desired condition has been fulfilled. Thus the gates 171 to 190 have an 0 applied to one of their inputs with a consequent 1 at their output either because the X-bar to which they are connected by way of an inverter is at 1 and/or the associated transducer provides an 0. Only one input of the gate 97 is a 0, that is the input connected to one of the gates 171 to 190 which has a 1 from the X-bar to which it is connected by way of an inverter, a 1 from the inverter 96 due to the program interrupt bar 92 being at 0, and a 1 from the associated transducer. When the condition is fulfilled the transducer input becomes 0 and the gate's output becomes 1 allowing clock pulses to reach the register 94 again so that the set point program continues.

The above specific description refers to chemical plants, but the apparatus according to the invention can be used in many other fields where servo loops are used for control.

Any number of control loops can be provided although there will be certain high and low economic limits.

Other algorithms besides that of equation (1) can be calculated if the calculating means is suitably modified.

We claim:
1. Actuator-drive apparatus for providing a signal to drive a reversible actuator in dependence upon groups of digital input signals, including a number of numerical storage means, one storage means for, and associated with, each of a number of digital input signals in a group of such signals, and each storage means being adapted to store a number and a sign representing the associated signal in each group, countdown, means for counting the numbers stored by the storage means down to zero at selectable predetermined rates, individual to each storage means, and control means for forming the sum of the times taken to count down the numbers stored by the storage means, taking account, in forming the said sum, of the signs of the numbers counted down, the control means also being adapted to provide a drive signal for an actuator for a time, and in a direction, determined by the sum and its sign, respectively.

2. Apparatus according to claim 1, wherein the control means includes first logic means for counting all numbers of like sign, in the storage means, down one after the other while at the same time counting down one after another all numbers of opposite sign, if any, and second logic means for providing the drive signal only when one number is being counted down at a time, the drive signal having a characteristic determining the direction of drive of the actuator dependent on the sign of the number being counted down.

3. Apparatus according to claim 2 wherein the means for counting numbers down includes an oscillator, coupled to a multistage frequency division circuit having a number of output terminals at which different frequencies can be obtained, and mans for selecting said output terminals and coupling them to individual storage means to control rate of countdown.

4. First and second actuator drive apparatus according to claim 2 including third logic means for interconnecting the first and second apparatus to provide override control for the first apparatus to ensure that the second apparatus provides its drive signal only if the first apparatus does not provide such a signal.

5. Control apparatus including actuator drive apparatus according to claim 2 including a plurality of measurement means, each of which has a digital output and is adapted to measure a quantity to be controlled, selection means for repeatedly selecting the outputs of the measurement means one at a time and for selecting, at the same time, the appropriate one of a plurality of numerical inputs to the apparatus which are representative, at that time, of desired values of the quantities measured, and calculating means for determining errors by finding the difference between the concurrent selected output and selected numerical input, there being one said actuator drive apparatus having one storage means and one countdown means, associated with each measurement means, for multiplying the difference derived from measurement by that measurement means by a predetermined constant proportional to the predetermined countdown rate for that storage means, the actuator or said one apparatus controlling, at least partially, the quantity measured by that measurement means.

6. Control apparatus according to claim 5 including a number of stores one for each measurement means, and adapted to hold the error relating to a quantity measured by that measuring means, wherein the calculating means is additionally adapted to determine the difference between each error and the previous error transferred from the appropriate store, and each said actuator drive apparatus has two said storage means one each for the two differences derived.

7. Control apparatus according to claim 6 wherein the selection means includes a matrix of spaced conductors, one group of the conductors forming the rows of the matrix and another group forming the columns thereof, the conductors of one group being further divided into subgroups with each conductor in each subgroup representing a number, means for sequentially marking the conductors in the other group by means of a unidirectional voltage, diode means for individually interconnecting the conductors of the two groups at selectable positions where the columns cross the rows whereby each subgroup of wires has conductors marked which together represent one of the said numerical inputs, as each conductor in the said other group is marked.

8. Control apparatus according to claim 7 wherein the selection means includes scanning means for transferring the outputs of the measurement means, when a measurement is complete, and the appropriate numerical input from the matrix to the calculating means.

9. Control apparatus according to claim 8 including program interrupt means for interrupting the sequential marking of conductors sand allowing marking to proceed only when one or more conditions in plant controlled by the apparatus have been achieved.

10. Control apparatus according to claim 5 wherein the calculating means calculates at least two of the terms, preceded by constants $K_1, K_2 \ldots K_p$, in the following equation:

$$\Delta P(nT) = K_1 e(nT) + K_2 [e(nT) - e((n-1)T)] + \ldots$$

$$\ldots + K_p [e(nT) - (p-1)e((n-1)T)$$

$$+ \frac{(p-1)(p-2)}{2!} e((n-2)T) \ldots$$

$$+ (-1)^s \frac{(p-1)(p-2) \ldots (p-s)}{2!} e((n-s)T) \ldots$$

$$+ (-1)^{p-1} e((n-(p-1))T)]$$

where $\Delta P(nT)$ is an increment of the position of an output member of the actuator after a number, $n$, of periods of time $T$; and $e(nT), e(n-1)T \ldots e(n-(p-1))T$ are errors obtained by taking the selected output from the selected numerical input at times $nT, (n-1)T \ldots (n-(p-1)T$, respectively, and each said actuator drive apparatus has a storage means for each term in the said equation.

11. Control apparatus according to claim 7 including feedforward measurement means, for at least one of the actuators, having a digital output and being adapted to measure a quantity to be controlled at a point before the actuator acts to control the said quantity and third logic means for interconnecting the first and second apparatus to provide override control for the first apparatus to ensure that the second apparatus provides its drive signal only if the first apparatus does not provide such a signal, the feed-forward measurement means being coupled to the first or second actuator-drive apparatus and the other actuator-drive apparatus being coupled to the calculating means.

12. Control apparatus according to claim 11 wherein each measuring means includes a voltage-to-frequency converter which provides a signal whose frequency is dependent upon an analog voltage representative of a quantity, a gate to which the signal so provided is applied, and means for opening the gate for a predetermined time to give a frequency count representative of the quantity.

13. Apparatus according to claim 12 including a plurality of actuators, each actuator comprising an induction motor.

* * * * *